United States Patent
Liao et al.

(10) Patent No.: US 9,417,743 B2
(45) Date of Patent: Aug. 16, 2016

(54) TOUCH CONTROL DEVICE, TOUCH CONTROL DISPLAY DEVICE, DISPLAY DEVICE AND CONTROL METHOD THEREOF

(71) Applicant: WINTEK CORPORATION, Taichung (TW)

(72) Inventors: Hsiao-Hui Liao, Taichung (TW); Ting-Yu Chang, Kaohsiung (TW); Ching-Fu Hsu, Taichung (TW); Chen-Ho Hsu, Kaohsiung (TW); Yu-Hung Chang, Miaoli County (TW)

(73) Assignee: WINTEK CORPORATION, Taichung (TW)

( * ) Notice: Subject to any disclaimer, the term of this patent is extended or adjusted under 35 U.S.C. 154(b) by 130 days.

(21) Appl. No.: 14/224,082

(22) Filed: Mar. 25, 2014

(65) Prior Publication Data
US 2014/0285468 A1    Sep. 25, 2014

(30) Foreign Application Priority Data

Mar. 25, 2013  (TW) .............................. 102110482 A

(51) Int. Cl.
G06F 3/045    (2006.01)
G06F 3/044    (2006.01)
H04B 5/00     (2006.01)

(52) U.S. Cl.
CPC .............. *G06F 3/044* (2013.01); *H04B 5/0075* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 2013/0017867 A1* | 1/2013 | Lee | H01Q 7/06 455/566 |
| 2013/0082937 A1* | 4/2013 | Liu | G06F 1/3262 345/173 |
| 2013/0162594 A1* | 6/2013 | Paulsen | G06F 3/044 345/174 |
| 2013/0176179 A1* | 7/2013 | Park | H01Q 1/243 343/702 |
| 2013/0310112 A1* | 11/2013 | You | H04W 52/0267 455/566 |
| 2014/0176819 A1* | 6/2014 | Yilmaz | G06F 1/1692 349/12 |

* cited by examiner

*Primary Examiner* — Adam R Giesy
*Assistant Examiner* — Henok Heyi
(74) *Attorney, Agent, or Firm* — Ming Chow; Sinorica, LLC

(57) ABSTRACT

A touch control device includes a touch area, a border area, an inductive coil, a proximity sensing unit, a near field communication unit, and a switch module. The touch area is for sensing touch input. The border area is located at periphery of the touch area. The inductive coil is located on the border area. The proximity sensing unit is for transmitting a driving signal to the inductive coil when being coupled to a first end of the inductive coil, and determining whether the inductive coil is close to an object according to a sensing signal generated by the inductive coil. The near field communication unit is for performing near field communication when being coupled to the first end and a second end of the inductive coil. The switch module is for controlling coupling statuses of the proximity sensing unit and the near field communication unit to the inductive coil.

13 Claims, 6 Drawing Sheets

TOUCH CONTROL DEVICE, TOUCH CONTROL DISPLAY DEVICE, DISPLAY DEVICE AND CONTROL METHOD THEREOF

BACKGROUND OF THE INVENTION

1. Field of the Invention

The present invention relates to a touch control device, a touch control display device, a display device, and a control method thereof, and more particularly, to a touch control device, a touch control display device, a display device, and a control method capable of integrating a proximity function and a near field communication function.

2. Description of the Prior Art

As related technology keeps improving, functions of a handheld electronic device are getting more powerful. The current handheld electronic devices can be utilized for processing data, making calls, surfing Internet, executing application programs or video games, etc. In order to operate the handheld electronic device easier, various kinds of input devices and input methods are gradually developed, wherein touch input technology is the most widely accepted input method to consumers. The touch input technology generates touch signals by sensing motion of a user finger on a touch screen, and then the handheld electronic device determines a command inputted by the user according to the touch signals transmitted from a touch area, so as to perform operations. Therefore, physical buttons of the handheld electronic device can be reduced, or even no physical button is required for input.

However, when the handheld electronic device has more functions, the handheld electronic device requires more elements, such that size and weight of the handheld electronic device are increased. Therefore, it is an important topic to integrate all kinds of elements with different functions.

SUMMARY OF THE INVENTION

An object of the present invention is to provide a touch control device, a touch control display device, a display device, and a control method capable of integrating a proximity function and a near field communication function, so as to solve problems of the prior art.

The touch control device of the present invention comprises a touch area, a border area, a inductive coil, a proximity sensing unit, a near field communication unit, and a switch module. The touch area is for sensing touch input. The border area is located at periphery of the touch area. The inductive coil is located on the border area. The inductive coil has a first end and a second end. The proximity sensing unit is for transmitting a driving signal to the inductive coil when being coupled to the first end of the inductive coil, and determining whether the inductive coil is close to an object according to a corresponding sensing signal generated by the inductive coil. The near field communication unit is for performing near field communication when being coupled to the first end and the second end of the inductive coil. The switch module is for controlling coupling statuses of the proximity sensing unit and the near field communication unit to the inductive coil.

The control method of the present invention comprises providing a touch control device comprising a touch area for sensing touch input, a border area located at periphery of the touch area, a inductive coil located on the border area, a proximity sensing unit for determining whether the inductive coil is close to an object when being coupled to the inductive coil, and a near field communication unit for performing near field communication when being coupled to the inductive coil; and controlling coupling statuses of the proximity sensing unit and the near field communication unit to the inductive coil according to a communication status of the touch control device.

The touch control display device of the present invention comprises a display module, a touch module, a inductive coil, a proximity sensing unit, a near field communication unit, and a switch module. The touch module is arranged on the display module. The touch module comprises a touch area for sensing touch input, and a border area located at periphery of the touch area. The inductive coil is located on the border area. The inductive coil has a first end and a second end. The proximity sensing unit is for transmitting a driving signal to the inductive coil when being coupled to the first end of the inductive coil, and determining whether the inductive coil is close to an object according to a corresponding sensing signal generated by the inductive coil. The near field communication unit is for performing near field communication when being coupled to the first end and the second end of the inductive coil. The switch module is for controlling coupling statuses of the proximity sensing unit and the near field communication unit to the inductive coil.

The display device of the present invention comprises a display module, a inductive coil, a proximity sensing unit, a near field communication unit, and a switch module. The display module comprises a display area for displaying images, and a border area located at periphery of the display area. The inductive coil is located on the border area, and the inductive coil has a first end and a second end. The proximity sensing unit is for transmitting a driving signal to the inductive coil when being coupled to the first end of the inductive coil, and determining whether the inductive coil is close to an object according to a corresponding sensing signal generated by the inductive coil. The near field communication unit is for performing near field communication when being coupled to the first end and the second end of the inductive coil. The switch module is for controlling coupling statuses of the proximity sensing unit and the near field communication unit to the inductive coil.

In contrast to the prior art, the touch control device, the touch control display device, and the display device of the present invention can integrate a sensing capacitor of the proximity sensing unit and an antenna of the near field communication unit into the inductive coil. Therefore, a number of elements can be reduced, and size and weight of the device can be correspondingly reduced as well.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
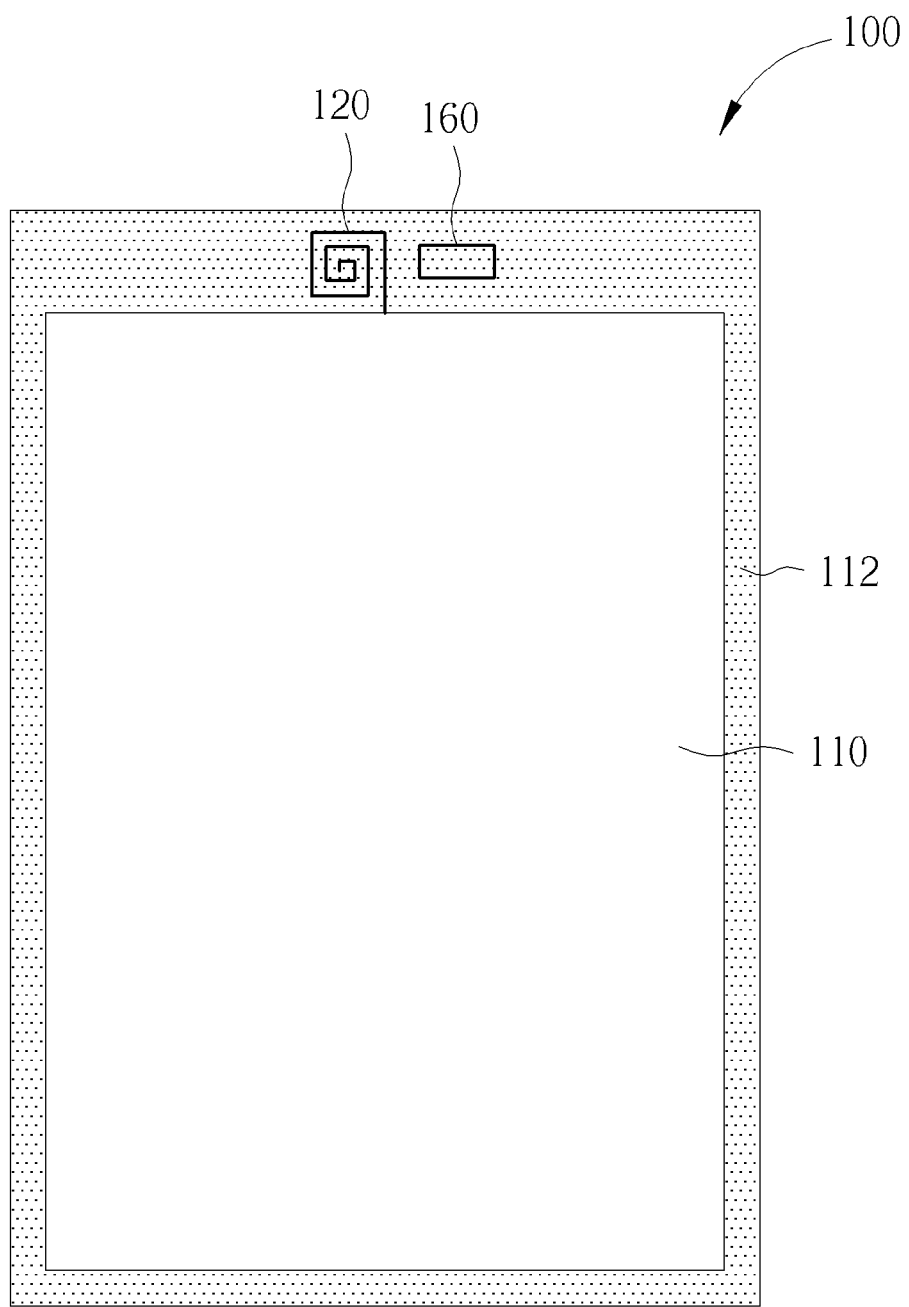
FIG. 1 is a diagram showing a touch control device of the present invention.
Figure 2:
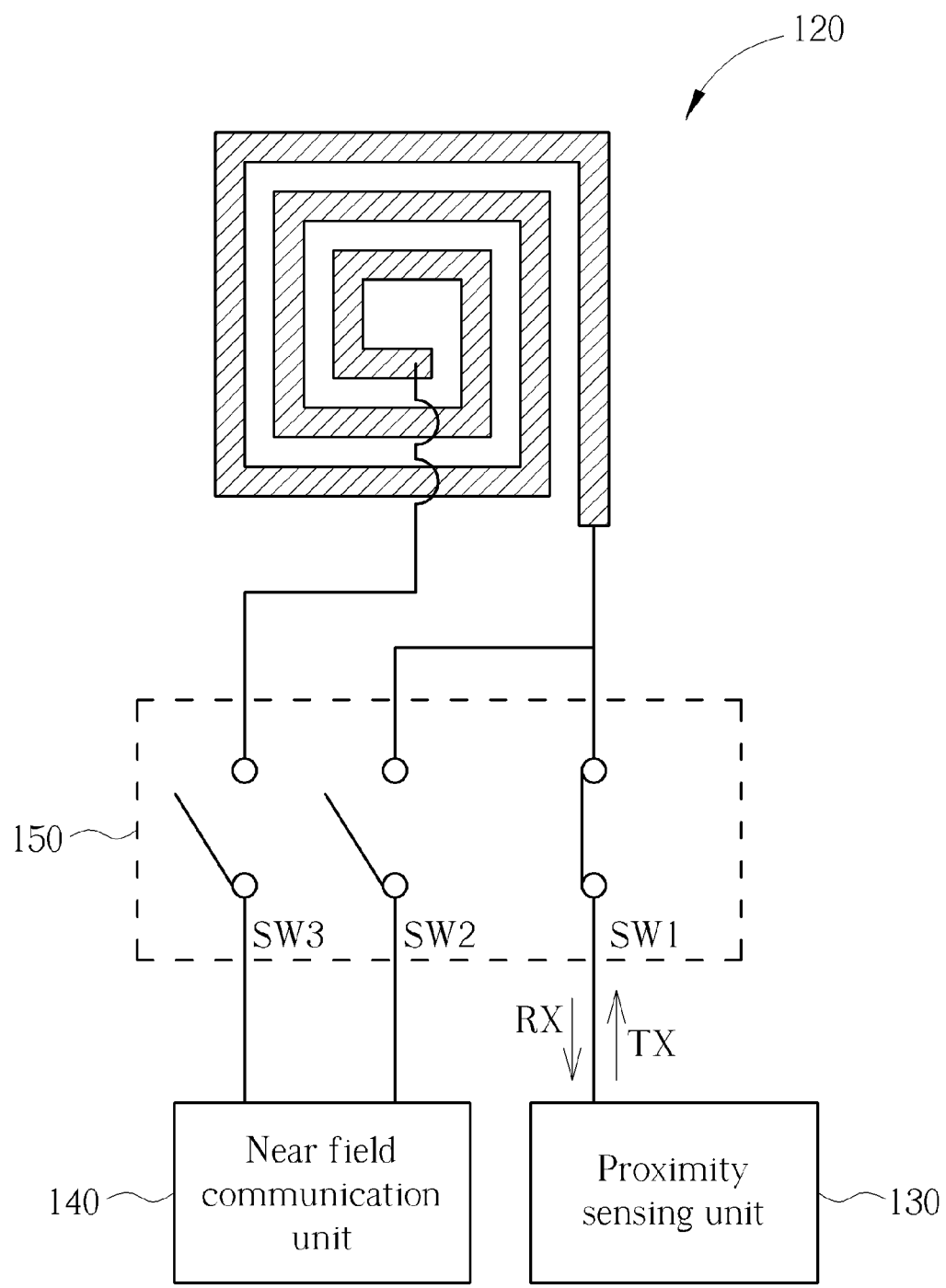
FIG. 2 is a diagram showing the touch control device of the present invention performing a proximity function.
Figure 3:
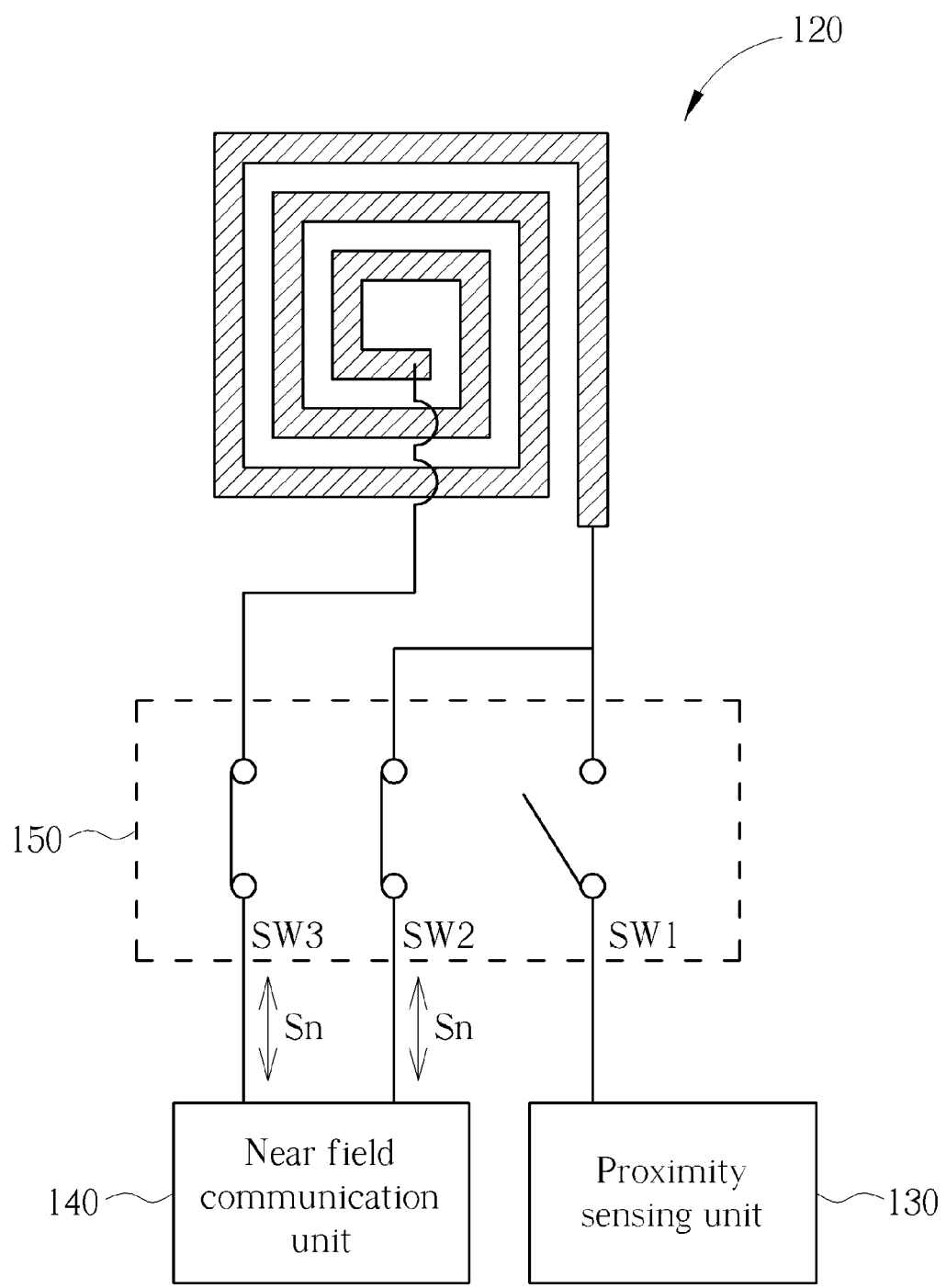
FIG. 3 is a diagram showing the touch control device of the present invention performing a near field communication function.

Please refer to FIG. 1 to FIG. 3 together. FIG. 1 is a diagram showing a touch control device of the present invention. FIG. 2 is a diagram showing the touch control device of the present invention performing a proximity function. FIG. 3 is a diagram showing the touch control device of the present invention performing a near field communication function. As shown in figures, the touch control device 100 of the present invention comprises a touch area 110, a border area 112, an inductive coil 120, a proximity sensing unit 130, a near field communication unit 140, and a switch module 150. The touch area 110 can comprise a plurality of inductive electrodes for sensing touch input, but is not limited to the above. The plurality of inductive electrodes can be selectively arranged on or extended to the border area 112, so as to allow the border area 112 having a touch function. The border area 112 is located at periphery of the touch area 110. The inductive coil 120 is located on the border area 112. The proximity sensing unit 130 is configured to transmit a driving signal to the inductive coil 120 when being coupled to the inductive coil 120, and determine whether the inductive coil 120 is close to an object according to a corresponding sensing signal generated by the inductive coil 120, so as to perform a proximity function. The near field communication unit 140 is configured to perform a near field communication function when being coupled to the inductive coil 120. The switch module 150 is coupled to the inductive coil 120, the proximity sensing unit 130, and the near field communication unit 140 for controlling coupling statuses of the proximity sensing unit 130 and the near field communication unit 140 to the inductive coil 120. Wherein, the proximity sensing unit 130 and the near field communication unit 140 can be respectively implemented by a micro control unit (not shown). The switch module 150 can be made by a thin film transistor (TFT) array process.

Please refer to FIG. 2, and refer to FIG. 1 as well. As shown in FIG. 2, the inductive coil 120 has a first end and a second end. The switch module 150 comprises a first switch SW1, a second switch SW2, and a third switch SW3. The first switch SW1 is coupled between the first end of the inductive coil 120 and the proximity sensing unit 130. The second switch SW2 is coupled between the first end of the inductive coil 120 and the near field communication unit 140. The third switch SW3 between the second end of the inductive coil 120 and the near field communication unit 140. When the switch module 150 turns on (enables) the first switch SW1 and turns off (disables) the second switch SW2 and the third switch SW3, the proximity sensing unit 130 is coupled to the first end of the inductive coil 120, which can work as a sensing capacitor of the proximity sensing unit 130. Therefore, the proximity sensing unit 130 can transmit a driving signal TX to the inductive coil 120, and determine whether the inductive coil 120 is close to an object (such as a human body) according to a corresponding sensing signal RX (variation of capacitance) generated by the inductive coil 120.

Please refer to FIG. 3, and refer to FIG. 1 as well. As shown in FIG. 3, when the switch module 150 turns off (disables) the first switch SW1 and turns on (enables) the second switch SW2 and the third switch SW3, the near field communication unit 140 is coupled to the first end and the second end of the inductive coil 120, which can work as an antenna of the near field communication unit 140. Therefore, the near field communication unit 140 can transmit or receive a near field communication signal Sn via the inductive coil 120.

Figure 4:
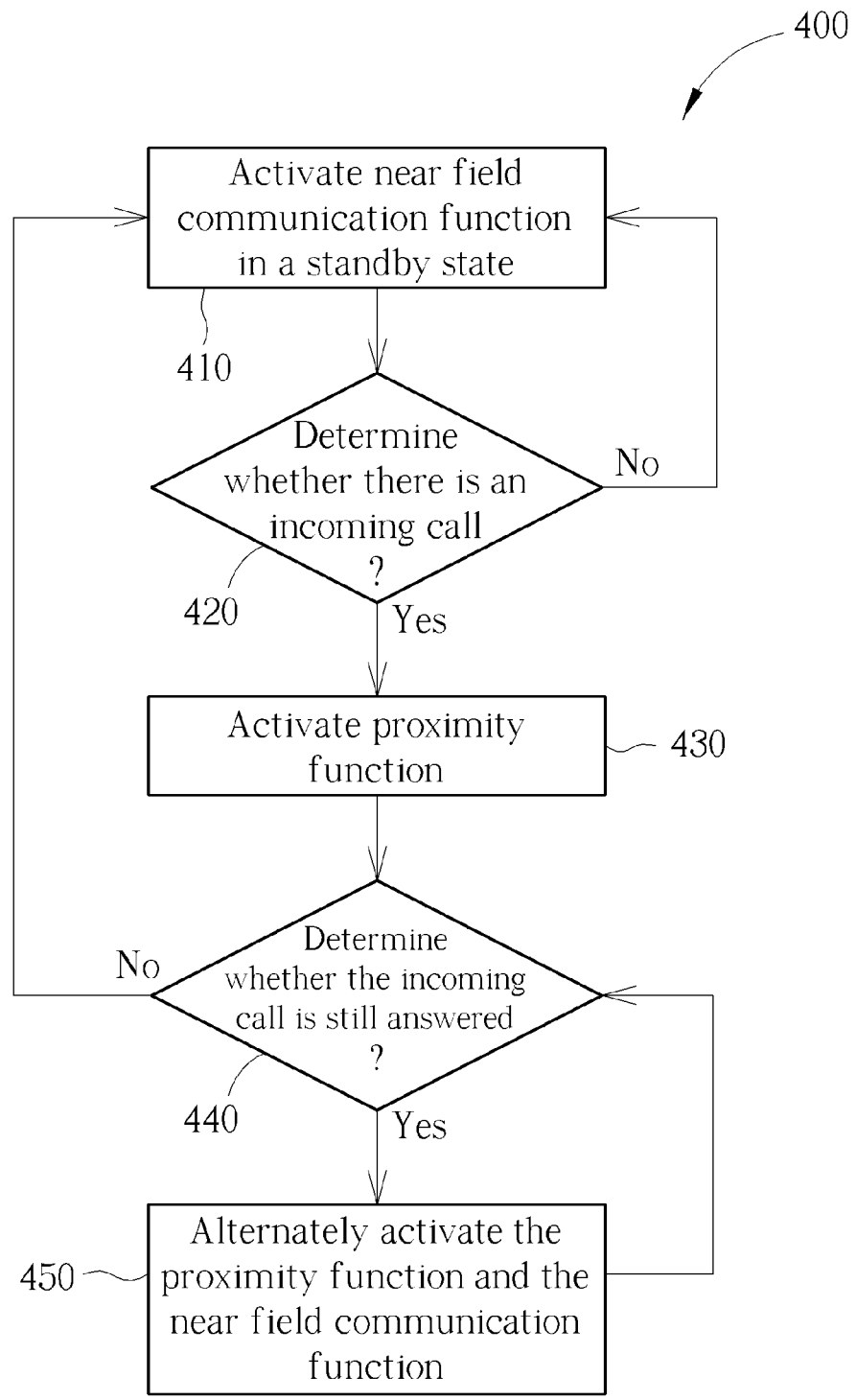
FIG. 4 is a flowchart showing a control method of the touch control device of the present invention.

According to the above arrangement, when the touch control device 100 of the present invention is utilized in a handheld electronic device, such as a smart phone, the touch control device 100 of the present invention can integrate the proximity function and the near field communication function, and control coupling statuses of the proximity sensing unit 130 and the near field communication unit 140 to the inductive coil 120 according to a communication status of the touch control device 100. For example, please refer to FIG. 4, and refer to FIG. 1 to FIG. 3 as well. FIG. 4 is a flowchart 400 showing a control method of the touch control device of the present invention. In step 410, the touch control device 100 is in a standby state, thus, the near field communication unit 140 is coupled to the first end and the second end of the inductive coil 120 by turning on the second switch SW2 and the third switch SW3, in order to activate the near field communication function. A user then can utilize the touch control device 100 to perform the near field communication, such as performing an electronic wallet function. In step 420, the touch control device 100 determines whether there is an incoming call. If there is an incoming call, continue to step 430; if there is no incoming call, return to step 410. In step 430, the proximity sensing unit 130 is coupled to the first end of the inductive coil 120 by turning on the first switch SW1, in order to activate the proximity function. The proximity sensing unit 130 can determine whether the user is close to the inductive coil 120 according to the sensing signal RX generated by the inductive coil 120. If the proximity sensing unit 130 determines that the user is close to the inductive coil 120, the proximity sensing unit 130 can stop the touch function of the touch area 110, in order to prevent the touch area 110 from being inadvertently touched. In step 440, the touch control device 100 determines whether the incoming call is still answered. If the incoming call is still answered, continue to step 450; if the incoming call is no longer answered and disconnected, return to step 410. In step 450, the switch module 150 may alternately couple the proximity sensing unit 130 and the near field communication unit 140 to the inductive coil 120, in order to alternately activate the proximity function and the near field communication function, such that when the user continues answering the incoming call, the touch control device 100 not only can prevent the touch area 110 from being inadvertently touched, but also can perform the near field communication function.

In the embodiment of the present invention, the inductive coil 120 can be arranged to locate on the border area 112, such that the inductive coil 120 can be hidden in the border area 112 without being seen. Moreover, the inductive coil 120 can be arranged at a position close to a receiver hole 160, such that when the user is answering the incoming call, the proximity sensing unit 130 can determine whether the user is close to the receiver hole 160 through the inductive coil 120, in order to prevent the touch area 110 from being inadvertently touched. The inductive coil 120 can be made of conductive material such as gold, silver, silver glue, copper, and copper glue etc., and resistance of the inductive coil 120 is preferred to be less than 10 ohm.

In addition, the proximity sensing unit 130 can be a touch driving circuit of the touch area 110, such that the proximity sensing unit 130 can respectively output driving signals for driving the touch area 110 to perform the touch function and driving the inductive coil 120 to perform the proximity function. In order to prevent signal interference between the proximity sensing unit 130 and the near field communication unit 140, operation frequencies of the proximity sensing unit 130 and the near field communication unit 140 can be different.

Figure 5:
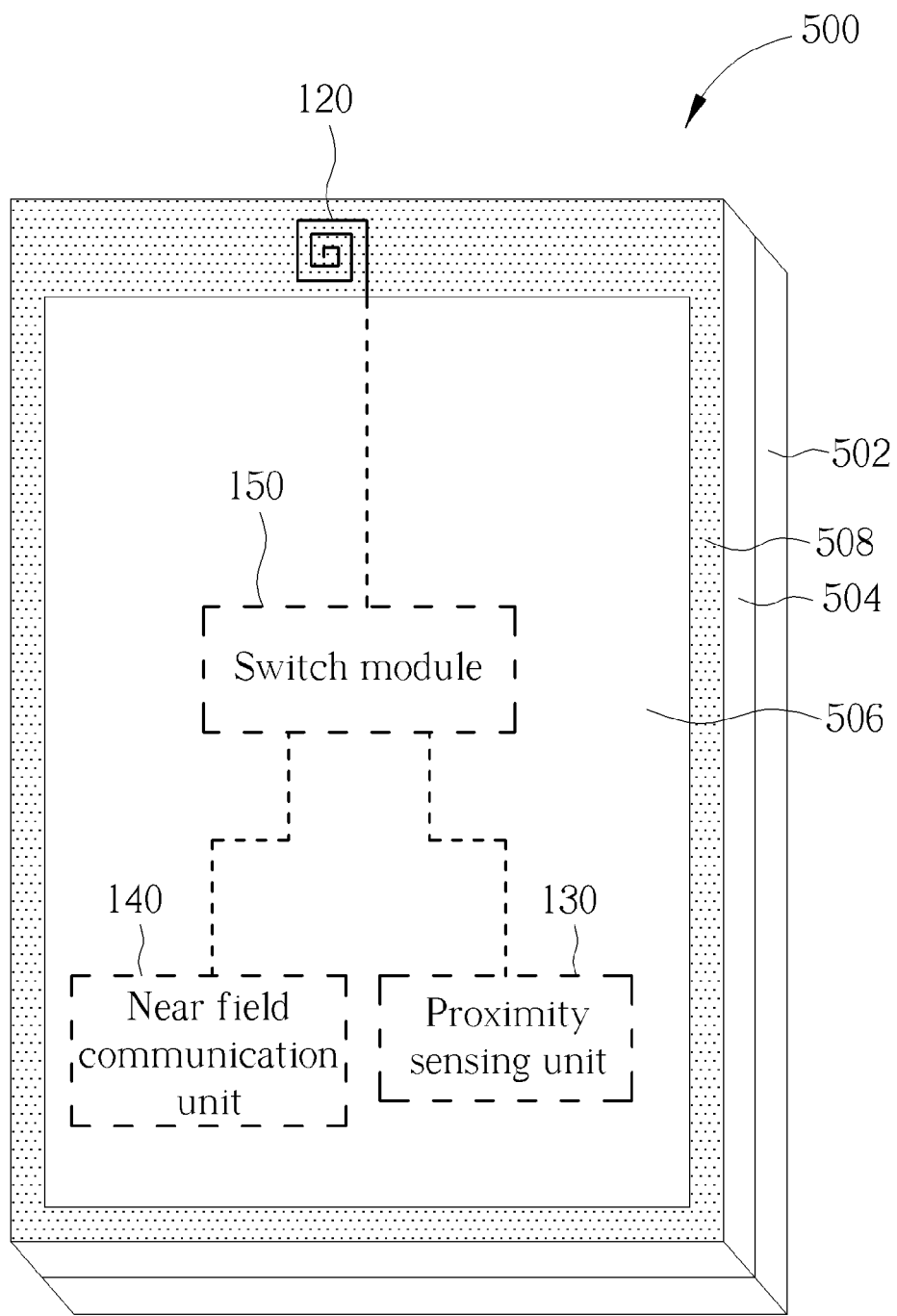
FIG. 5 is a diagram showing a touch control display device of the present invention.

The above integration structure of the proximity function and the near field communication function is not limited to the touch control device. Please refer to FIG. 5. FIG. 5 is a diagram showing a touch control display device of the present invention. As shown in FIG. 5, the touch control display device 500 of the present invention comprises a display module 502, a touch module 504, an inductive coil 120, a proximity sensing unit 130, a near field communication unit 140, and a switch module 150. The touch module 504 is arranged on the display module 502. The touch module 504 comprises a touch area 506 for sensing touch input, and a border area 508 located at periphery of the touch area 506. The inductive coil 120 is located on the border area 508 of the touch module 504.

Figure 6:
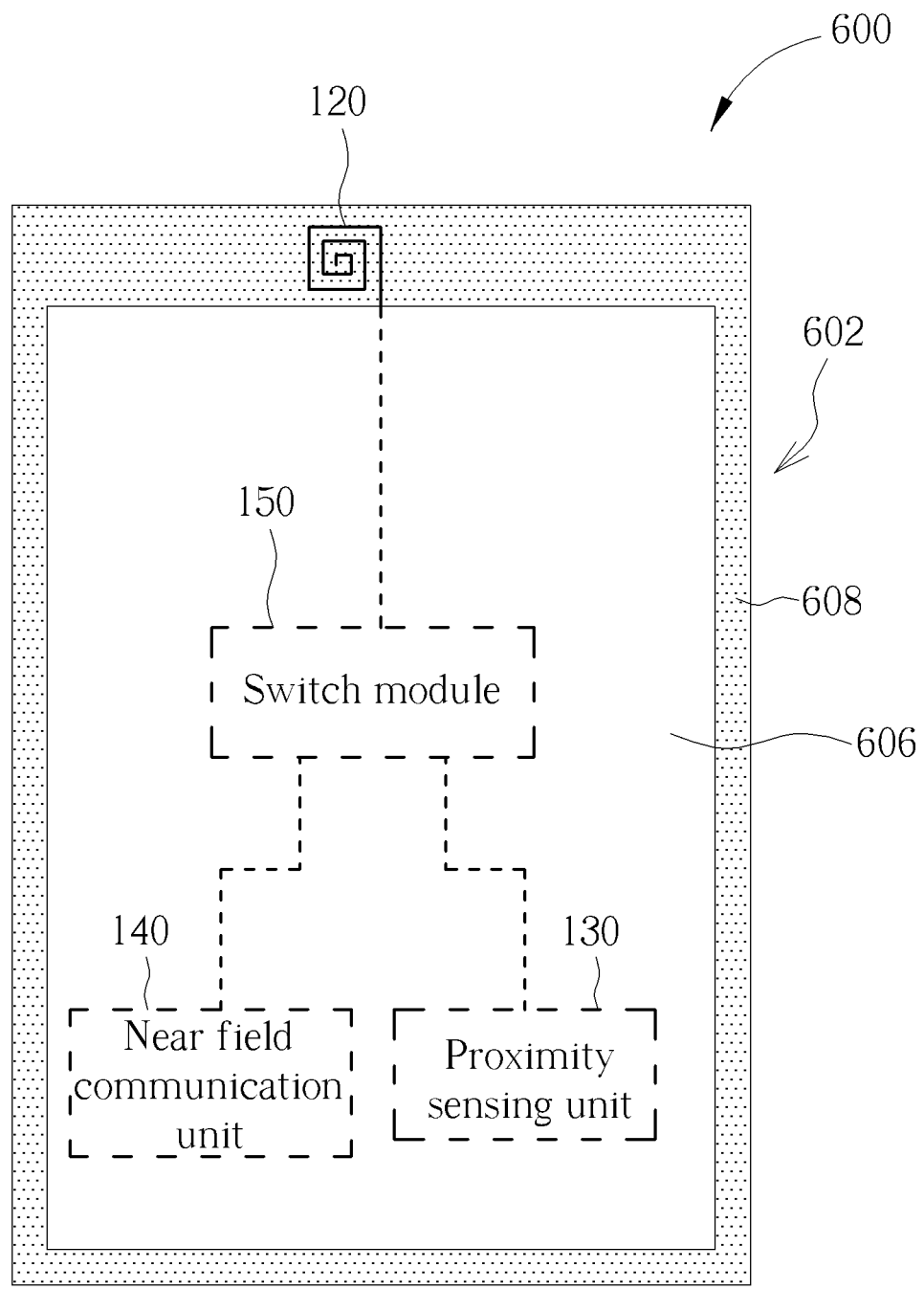
FIG. 6 is a diagram showing a display device of the present invention.

Please refer to FIG. 6. FIG. 6 is a diagram showing a display device 600 of the present invention. The display device 600 of the present invention comprises a display module 602, an inductive coil 120, a proximity sensing unit 130, a near field communication unit 140, and a switch module 150. The display module 602 comprises a display area 606 for displaying images, and a border area 608 located at periphery of the display area 606. The inductive coil 120 is located on the border area 608 of the display module 602.

In the embodiments of FIG. 5 and FIG. 6, the sensing coli 120, the proximity sensing unit 130, the near field communication unit 140 and the switch module 150 are identical to those in the embodiments of FIG. 2 and FIG. 3. Therefore, they are not further illustrated.

In contrast to the prior art, the touch control device, the touch control display device, and the display device of the present invention can integrate a sensing capacitor of the proximity sensing unit and an antenna of the near field communication unit into the inductive coil. Therefore, a number of elements can be reduced, and size and weight of the device can be correspondingly reduced as well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch control device, comprising:
   a touch area for sensing touch input;
   a border area located at periphery of the touch area;
   an inductive coil located on the border area, the inductive coil having a first end and a second end;
   a proximity sensing unit for transmitting a driving signal to the inductive coil when being coupled to the first end of the inductive coil, and determining whether the inductive coil is close to an object according to a corresponding sensing signal generated by the inductive coil;
   a near field communication unit for performing near field communication when being coupled to the first end and the second end of the inductive coil; and
   a switch module for controlling coupling statuses of the proximity sensing unit and the near field communication unit to the inductive coil, wherein the switch module comprises:
   a first switch coupled between the first end of the inductive coil and the proximity sensing unit;
   a second switch coupled between the first end of the inductive coil and the near field communication unit; and
   a third switch coupled between the second end of the inductive coil and the near field communication unit.

2. The touch control device of claim 1, wherein the proximity sensing unit is a touch driving circuit of the touch area.

3. The touch control device of claim 1, wherein operation frequencies of the proximity sensing unit and the near field communication unit are different.

4. A control method of a touch control device, comprising:
   providing a touch control device comprising a touch area for sensing touch input, a border area located at periphery of the touch area, a inductive coil located on the border area, a proximity sensing unit for determining whether the inductive coil is close to an object when being coupled to the inductive coil, and a near field communication unit for performing near field communication when being coupled to the inductive coil; and
   controlling coupling statuses of the proximity sensing unit and the near field communication unit to the inductive coil with a switch module according to a communication status of the touch control device, wherein the switch module comprises:
   a first switch coupled between a first end of the inductive coil and the proximity sensing unit;
   a second switch coupled between the first end of the inductive coil and the near field communication unit; and
   a third switch coupled between a second end of the inductive coil and the near field communication unit.

5. The control method of claim 4, wherein controlling the coupling statuses of the proximity sensing unit and the near field communication unit to the inductive coil according to the communication status of the touch control device comprises:
   coupling the near field communication unit to the inductive coil when the touch control device has no incoming call.

6. The control method of claim 4, wherein controlling the coupling statuses of the proximity sensing unit and the near field communication unit to the inductive coil according to the communication status of the touch control device comprises:
   coupling the proximity sensing unit to the inductive coil when the touch control device has an incoming call.

7. The control method of claim 6, further comprising:
   alternately coupling the proximity sensing unit and the near field communication unit to the inductive coil when the touch control device continues answering the incoming call.

8. The control method of claim 6, further comprising:
   the proximity sensing unit stopping a sensing function of the touch area when the proximity sensing unit determines that the inductive coil is close to an object.

9. A touch control display device, comprising:
   a display module;
   a touch module arranged on the display module, comprising:
   a touch area for sensing touch input; and
   a border area located at periphery of the touch area;
   an inductive coil located on the border area, the inductive coil having a first end and a second end;
   a proximity sensing unit for transmitting a driving signal to the inductive coil when being coupled to the first end of the inductive coil, and determining whether the inductive coil is close to an object according to a corresponding sensing signal generated by the inductive coil;
   a near field communication unit for performing near field communication when being coupled to the first end and the second end of the inductive coil; and
   a switch module for controlling coupling statuses of the proximity sensing unit and the near field communication unit to the inductive coil, wherein the switch module comprises:

a first switch coupled between the first end of the inductive coil and the proximity sensing unit;

a second switch coupled between the first end of the inductive coil and the near field communication unit; and a third switch coupled between the second end of the inductive coil and the near field communication unit.

10. The touch control display device of claim 9, wherein the proximity sensing unit is a touch driving circuit of the touch area.

11. The touch control display device of claim 9, wherein operation frequencies of the proximity sensing unit and the near field communication unit are different.

12. A display device, comprising:
a display module, comprising;
a display area for displaying images; and
a border area located at periphery of the display area;
an inductive coil located on the border area, the inductive coil having a first end and a second end;
a proximity sensing unit for transmitting a driving signal to the inductive coil when being coupled to the first end of the inductive coil, and determining whether the inductive coil is close to an object according to a corresponding sensing signal generated by the inductive coil;
a near field communication unit for performing near field communication when being coupled to the first end and the second end of the inductive coil; and
a switch module for controlling coupling statuses of the proximity sensing unit and the near field communication unit to the inductive coil, wherein the switch module comprises:
a first switch coupled between the first end of the inductive coil and the proximity sensing unit;
a second switch coupled between the first end of the inductive coil and the near field communication unit; and
a third switch coupled between the second end of the inductive coil and the near field communication unit.

13. The display device of claim 12, wherein operation frequencies of the proximity sensing unit and the near field communication unit are different.

* * * * *